United States Patent [19]

Holden

[11] Patent Number: 4,894,417

[45] Date of Patent: Jan. 16, 1990

[54] POLYMERIC COMPOSITION

[75] Inventor: Geoffrey Holden, Houston, Tex.

[73] Assignee: Shell Oil Company, Houston, Tex.

[21] Appl. No.: 256,517

[22] Filed: Oct. 12, 1988

[51] Int. Cl.$^4$ .................. C08L 23/10; C08L 23/18; C08L 53/02

[52] U.S. Cl. ........................................................ 525/98

[58] Field of Search ............................................. 525/98

[56] References Cited

U.S. PATENT DOCUMENTS

| | | | |
|---|---|---|---|
| Re. 27,145 | 6/1971 | Jones | 260/880 |
| 3,037,954 | 6/1962 | Gessler et al. | 260/29.8 |
| 3,112,300 | 11/1963 | Natta et al. | 260/93.7 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,634,595 | 1/1972 | Pasquali | 84/1.04 |
| 3,670,054 | 6/1972 | De La Mare et al. | 260/880 |
| 3,700,633 | 10/1972 | Wald et al. | 260/880 |
| 3,758,643 | 9/1973 | Fischer | 260/897 |
| 4,033,888 | 7/1977 | Kiovsky | 252/56 |
| 4,077,893 | 3/1978 | Kiovsky | 252/56 |
| 4,079,099 | 3/1978 | Gergen et al. | 260/876 |
| 4,104,210 | 8/1978 | Coran et al. | 260/4 |
| 4,107,130 | 8/1978 | Gergen et al. | 260/40 |
| 4,130,535 | 12/1978 | Coran et al. | 260/33.6 |
| 4,141,847 | 2/1979 | Kiovsky | 252/51.5 |
| 4,391,494 | 7/1983 | Hershel | 350/442 |
| 4,444,953 | 8/1987 | St. Clair | 525/98 |

OTHER PUBLICATIONS

Thermoplastic Elastomers, A Comprehensive Review, N. R. Legge et al., Munich, Germany, Hanser Publications, 1987. Chapters 7 & 14.

Primary Examiner—Carman J. Seccuro

[57] ABSTRACT

A thermoplastic elastomer composition comprising a polymer of an α-olefin containing from 2 to 5 carbon atoms, a 4-methyl-1-pentene polymer and a selectively hydrogenated block copolymer comprising at least two polymeric blocks predominantly polymerized from monoalkenyl aromatic hydrocarbon monomer units and at least one polymeric block predominantly polymerized from conjugated diolefin monomer units which at least one polymeric block is selectively hydrogenated after polymerization. The thermoplastic elastomer composition is particularly useful in the preparation of an IPN having a higher service temperature than similar structures known in the prior art. In general, the thermoplastic elastomer composition will comprise from about 20 to about 70 wt % of the α-olefin polymer, from about 20 to about 70 wt % of the 4-methyl-1-pentene polymer and from about 5 to about 25 wt % of the block copolymer. In a preferred embodiment, the α-olefin polymer will be an isotactic polypropylene having a crystallinity of at least 50%, the 4-methyl-1-pentene polymer will be a copolymer and the selectively hydrogenated block copolymer will comprise two polymeric blocks predominantly polymerized from monoalkenyl aromatic hydrocarbon monomer units and at least one polymeric block predominantly polymerized from conjugated diolefin monomer units that has been hydrogenated after polymerization. In a most preferred embodiment, the selectively hydrogenated block copolymer will contain terminal polymeric blocks which are styrene homopolymers and a central polymeric block which is a homopolymer of butadiene that has been hydrogenated after polymerization.

9 Claims, No Drawings

POLYMERIC COMPOSITION

BACKGROUND

1. Field of the Invention

This invention relates to a polymeric composition. More particularly, this invention relates to a thermoplastic elastomer composition.

2. Prior Art

Thermoplastic elastomer compositions are, of course, well known in the prior art. One type of thermoplastic elastomer compositions comprises a crystalline polyolefin and a cured or at least partially cured elastomer as taught, for example, in U.S. Pat. Nos. 3,037,954; 3,758,643; 4,104,210 and 4,130,535 and in "Thermoplastic Elastomers—A Comprehensive Review", N. R. Legge et al., particularly Chapter 7 thereof, Munich, Germany, Hanser Publishers, 1987. In general, the thermoplastic elastomer compositions known in the prior art and/or articles fabricated therewith are said to exhibit excellent mechanical and dynamic properties, particularly high tensile strength, good toughness and good elongation. The thermoplastic elastomer compositions are useful for making a variety of articles by extrusion, injection molding, compression molding and the like. Molded articles prepared with these thermoplastic elastomer compositions, however, exhibit relatively low service temperatures-softening and becoming subject to distortion at relatively low temperatures. As a result, articles fabricated with the thermoplastic elastomer compositions known in the prior art often cannot be used in locations where elevated temperatures are experienced such as "under-the-hood" of an automobile operated with an internal combustion engine or the like.

It is of course known that articles for high temperature service can be fabricated from nylon, particularly nylon 6. Nylon is, however, difficult to mold and must be dried before molding. Moreover, nylon will become brittle if too dry. Nylon also has a relatively high specific gravity thereby requiring an increased weight of polymer to prepare any given structure. In light of the deficiency of the thermoplastic elastomeric composition heretofore known, and the difficulties encountered when nylon is used, the need for an improved polymer composition which can be conveniently used to mold articles for high temperature service is believed to be readily apparent.

PREFERRED EMBODIMENT OF THE INVENTION

It has now been discovered that the foregoing and other disadvantages of the prior art thermoplastic elastomer compositions can be overcome or at least significantly reduced with the thermoplastic elastomer composition of this invention. It is, therefore, an object of this invention to provide an improved thermoplastic elastomer composition. It is another object of this invention to provide such a thermoplastic elastomer composition which can be used to fabricate articles that will withstand relatively high temperatures without experiencing deformation. It is still another object of this invention to provide a thermoplastic elastomer composition which can be conveniently molded or fabricated. The foregoing and other objects and advantages will become apparent from the description of the invention set forth hereinafter and from the examples incorporated therein.

In accordance with the present invention, the foregoing and other objects and advantages are accomplished with a thermoplastic elastomer composition comprising a crystalline, lower α-olefin polymer, a 4-methyl-pentene-1 polymer and a selectively hydrogenated thermoplastic elastomer which is a block copolymer comprising at least two polymeric blocks predominantly of polymerized monoalkenyl aromatic hydrocarbon monomer units and at least one polymeric block predominantly of polymerized conjugated diolefin monomer units, which conjugateed diolefin polymer blocks are subsequently selectively hydrogenated. The several components of the thermoplastic elastomer composition of this invention will be blended so as to produce an interpenetrating network (IPN).

DETAILED DESCRIPTION OF THE INVENTION

As just indicated supra, the present invention relates to a thermoplastic elastomer composition comprising a crystalline, lower α-olefin polymer, a 4-methyl-pentene-1 polymer and a thermoplastic elastomer which is a block copolymer comprising at least two polymeric blocks predominantly of polymerized monoalkenyl aromatic hydrocarbon monomer units and at least one polymeric block predominantly of polymerized conjugated diolefin monomer units which conjugated diolefin polymer blocks are subsequently selectively hydrogenated. The several components contained in the thermoplastic elastomer composition of this invention will be blended so as to produce an interpenetrating network (IPN). For purposes of this invention, the thermoplastic elastomer composition will be considered an IPN if at least two of the polymers form at least partial continuous network phases which interlock with the other polymer networks and therefore result in a desirable balance of properties. As used herein, interpenetrating network is synonymous with "interlocking network" and "co-continuous interlocking network", which terms are frequently used in the prior art to describe such structures.

Polyolefins useful in the thermoplastic elastomer compositions of this invention are crystalline or crystallizable homopolymers and copolymers of α-olefins having from 2 to 5 carbon atoms. In general, the polyolefin, when used in the thermoplastic elastomer composition of this invention will exhibit a crystallinity of at least 30% as determined by X-ray chromotography. Particularly useful polyolefins include low density polyethylene, high density polyethylene, isotactic polypropylene, poly(1-butene), poly(1-pentene) and the like. The number average molecular weight of the olefin polymer will, generally, be above about 50,000, preferably above about 100,000. In addition, it is preferred that the apparent crystalline melting point be above about 100° C., preferably between about 100° C. and about 250° C., and more preferably between about 140° C. and about 250° C. Preparation of the various olefin homopolymers and copolymers useful in the thermoplastic elastomer composition of this invention are well known. Preparation of such polymers is taught generally in "olefin polymers", volume 14, Kirk-Othmer Encyclopedia of Chemical Technology, pp. 217–335 (1967).

The high density polyethylene useful in the thermoplastic elastomer composition of this invention will have an approximate crystallinity of over about 60% and a density in grams per cubic centimeter of between about 0.94 and 0.97 while the low density polyethylene useful in the thermoplastic elastomer composition of this invention will have an approximate crystallinity of over about 35% and a density between about 0.89 g/cm² and 0.94 g/cm². Most commercially available polyethylenes have number average molecular weights within the range from about 50,000 to about 500,000.

The polypropylene useful in the thermoplastic elastomer composition of this invention is the so-called isotactic polypropylene as opposed to atactic polypropylene. Isotactic polypropylene is described in the Kirk-Ohmer Encyclopedia of Chemical Technology cited above and, for example, in U.S. Pat. No. 3,112,300. The number average molecular weight of the polypropylene typically used in the thermoplastic elastomer composition of this invention will have a number average molecular weight in excess of about 100,000. Suitable isotactic polypropylenes may be prepared by using the methods well known in the prior art. Depending on the specific catalyst and polymerization conditions employed, the polymer produced may contain atactic as well as isotactic, syndiotactic and so-called stero-block molecules. These may be separated, if desired, by selective solvent extraction to yield products of low atactic content thereby increasing the crystallinity of the polymer. If desired, the polypropylene may be a copolymer containing minor amounts (1 to about 20% by weight) of ethylene or other lower α-olefins comonomers.

The poly(1-butene), useful in the thermoplastic elastomer composition of this invention will, preferably, also have an isotactic structure. Suitable poly(1-butene) may also be prepared using techniques well known in the prior art. As is well known, manufacturing operations, in all phases of polymer formation, are conducted in such a manner as to guarantee vigorous exclusion of water even in trace amounts.

The 4-methyl-1-pentene polymer useful in the thermoplastic elastomer composition of this invention will, generally, have an apparent crsytalline melting point of between about 220° and about 245° C. and a density within the range from about 0.82 to about 0.84 g/cm³. Monomeric 4-methyl-1-pentene is commercially manufactured by the alkali-metal catalized dimerization of propylene. Methods for preparing suitable 4-methyl-1-pentene polymers are known in the prior art and are described in the Kirk-Ohmer Encyclopedia of Chemical Technology, supplement volume. For example, the homopolymerization of 4-methyl-1-pentene with Ziegler-Natta type catalysts is described in the Kirk-Othmer Encyclopedia of Chemical Technology, supplement volume, pp. 789–792 (2nd edition, 1971). As a practical matter, however, the isotactic homopolymer of 4-methyl-1-pentene, while useful in the thermoplastic elastomer composition of this invention, has certain technical defects, such as brittleness. Therefore, 4-methyl-1-pentene copolymers are preferably used in the thermoplastic elastomer composition of this invention. Preparation of such copolymers is described in Kirk-Othmer Encyclopedia of Chemical Technology, supplement volume, pp. 792–907 (2nd edition, 1971) and such polymers are available commercially. One such commercially available copolymer is available from Mitsui Chemical Company under the tradename TPX ® resin. Comonomers that may be included in the 4-methyl-1-pentene copolymers useful in the thermoplastic elastic composition of this invention include linear α-olefins different from 4-methyl-1-pentene having from about 2 to about 18 carbon atoms. In general, the copolymer will contain from about 0.5 to 30 weight percent of the linear α-olefin comonomer.

In general, any of the thermoplastic elastomer block copolymers containing at least two polymeric blocks predominantly of polymerized monoalkenyl aromatic hydrocarbon monomer units and at least one polymeric block predominantly of polymerized conjugated diolefin monomer units known in the prior art may be selectively hydrogenated and used in the thermoplastic elastomer composition of this invention. The elastomeric block copolymers which may be selectively hydrogenated and rendered useful in the thermoplastic elastomer composition of this invention may have any one of several geometric structures. For example, the block copolymer may be linear, radial or branched. Linear block copolymers which are particularly useful in the thermoplastic elastomer composition of this invention include those block copolymers described in U.S. Pat. Nos. 3,231,635; 3,265,765 and 3,322,856, the disclosure of which patents are incorporated herein by reference. In general, linear block copolymers which may be selectively hydrogenated and used in the thermoplastic elastomer composition of this invention include those which may be represented by the general formula:

$$A_z-(B-A)_y-B_x$$

wherein:

A is a polymeric block predominantly of polymerized monoalkenyl-aromatic hydrocarbon monomer units;

B is a polymeric block predominantly of polymerized conjugated diolefin monomer units;

x is a number equal to 0 or 1 y is a whole number ranging from 1 to about 15; and z is a number equal to 1.

Block copolymers useful in the thermoplastic elastomer composition of this invention also include radial block copolymers such as those described in U.S. Pat. Nos. 4,033,888; 4,077,893; 4,141,847; 4,391,494 and 4,444,953, the disclosure of which patents are also incorporated herein by reference. The radial polymers which may be used in the thermoplastic elastomer composition of this invention include those which may be represented by the general formulae:

$$[B_x - (A - B)_y - A_z]_n - C; \text{ and}$$

$$(A - B)_{y'} - C - B'_{z'}$$

wherein:

A, B, x, and y are as previously defined;

Z is a number equal to zero or 1;

n is a number from 3 to about 20;

C is the core of the radial polymer formed with a polyfunctional coupling agent;

B' is a polymeric block predominantly of polymerized conjugated diolefin monomer units, which B' may be the same or different from B;

y' is an integer, generally ranging from 2 to about 15; and z' is an integer generally ranging from about 1 to 28. As used herein in connection with polymeric block composition, the recitation predominantly shall mean that the specified monomer or monomer type is the principal (at least 85 wt %) component in the polymeric block. Other copolymerizable monomers may, however, be present in the polymer block.

As is well known in the prior art and taught in the several patents cited above, block copolymers which may be selectively hydrogenated and used in the thermoplastic elastomer composition of this invention can be prepared in solution in the presence of an anionic initiator. The block structure results from adding the monomers sequentially. In general, polymerization of one or more monomers contained in a first block will be allowed to proceed at least substantially to completion before the monomer or monomers of the next successive block are added. Blends of homopolymers and block copolymers can be prepared by adding additional initiator after polymerization of one block is completed and before the monomer or monomers to be polymerized in the next succeeding block are added. Block copolymers containing three or more polymeric blocks can, of course, be prepared by coupling block copolymers containing two or more blocks. Also, radial block copolymers can be prepared by coupling block copolymer arms with a polyfunctional coupling agent containing three or more functional groups or capable of creating such a nucleus. Asymmetric radial polymers can be prepared by coupling a blend of different polymeric arms.

In general, the block copolymers which may be selectively hydrogenated and used in the thermoplastic elastomer composition of this invention will comprise polymeric blocks predominantly of polymerized monoalkenyl aromatic hydrocarbon monomer units having weight average molecular weights within the range from about 5,000 to about 50,000 and polymeric blocks predominantly of polymerized conjugated diolefin monomer units having weight average molecular weights within the range from about 10,000 to about 300,000. In general, the block copolymers useful in the thermoplastic elastomer composition of this invention will be selectively hydrogenated such that at least about 95% of the initial ethylenic unsaturation; i.e., the unsaturation incorporated by polymerization of the conjugated diolefin, contained therein is converted (saturated) while less than about 5% of the initial aromatic unsaturation contained therein is converted (saturated).

In general, and as indicated supra, the block copolymers useful in the thermoplastic elastomer composition of this invention will be selectively hydrogenated. In general, any of the selective hydrogenation methods known in the prior art may be used to effect this selective hydrogenation. Suitable selective hydrogenation processes are taught, for example, in U.S. Pat. Nos. 3,634,595; 3,670,054; 3,700,633 and Reissue 27,145.

In general, the methods known in the prior art for selectively hydrogenating polymers containing ethylenic unsaturation and aromatic unsaturation involve the use of a suitable catalyst. In the methods described in the foregoing patents, the catalyst is prepared by combining a Group VIII metal compound, particularly an iron group metal compound, with a suitable reducing agent such as an aluminum alkyl. The preferred Group VIII metal compounds are carboxylates and alkoxides. Also, while aluminum alkyls are specifically taught as preferred reducing agents, it is known in the prior art that alkyls and hydrides of metals of Groups I, II and III, particularly lithium, magnesium and aluminum, are effective reducing agents. As indicated in the foregoing patents, the hydrogenation catalyst is generally prepared by combining the Group VIII metal compound and the reducing agent in a suitable solvent or diluent at a temperature within the range from about 25° to about 90° C. before the catalyst is fed to the hydrogenation reactor. Satisfactory results can, however, frequently be obtained by feeding the catalytic component separately into the hydrogenation reactor. In general, the hydrogenation is accomplished in a suitable solvent for the polymer at a temperature within the range from about 25° to about 100° C. at a hydrogen partial pressure within the range from about 100 to about 1,000 psig. Catalysts concentrations within the range from about 1 to about 50 mmoles (gm moles) of Group VIII metal per 1 lbs of polymer are generally used and contacting at hydrogenation conditions is generally continued for a period of time within the range from about 10 to about 300 minutes.

In general, the thermoplastic elastomer composition of this invention will comprise from about 20 to about 70 wt % α-olefin polymer, from about 20 to about 70 wt % 4-methyl-1-pentene polymer and from about 5 to about 25 wt % block copolymer. As indicated supra, the several components of the thermoplastic elastomer composition of this invention will be blended so as to produce an IPN. Methods for blending so as to produce an IPN are well known in the prior art. A suitable method of such blending is described, for example, in U.S. Pat. Nos. 4,079,099 and 4,107,130, the disclosure of which patents are herein incorporated by reference. U.S. Pat. No. 4,079,099 teaches the preparation of an IPN with a polymeric blend comprising a selectively hydrogenated block copolymer and a 4-methyl-1-pentene polymer. U.S. Pat. No. 4,107,130 teaches preparation of an IPN with a polymeric blend comprising an α-olefin polymer, a selectively hydrogenated monoalkenyl arene-diene block copolymer and at least one dissimilar engineering thermoplastic resin. Suitable α-olefin polymers in U.S. Pat. No. 4,107,130 include polymers of 4-methyl-1-pentene.

As indicated in both of the above cited patents, there are at least two satisfactory methods by which polymeric components may be blended to produce an IPN. In the first method described in these patents, the blending is accomplished by dissolving each of the components in a common solvent at a temperature above the melting point of all the polymeric components blended, and then coagulating the blend by admixing in anti-solvent or non-solvent for each of the polymeric components. In the second method described, the polymeric components are intimately mixed in the molten state with sufficient mechanical shear and thermal energy to insure that interlocking of the various networks is achieved. Of these methods, the latter, second method, is most effective and convenient in preparing the compositions of this invention.

When the second of these processes is used to prepare the IPN with the thermoplastic elastomer composition of this invention, the blending will be accomplished at a temperature above the melting point of all of the polymeric components blended. In general, the blending temperature will be selected as a function of the particular polymers to be blended and a temperature above the melting temperature of the highest temperature melting polymer will be selected. In addition, and as explained more fully hereinafter, the blending temperature may also be selected so as to permit the isoviscous mixing of the polymers. Typically, the blending will be accomplished at a temperature within the range from about 150° C. to about 325° C. Another parameter that is important in melt blending to insure the formation of interlocking networks is the matching or near matching of the viscosities of the several polymeric components to be blended at the temperature and shear stress of the mixing apparatus. In this regard, it should be noted that the better the interdispersion of the 4-methyl-1-pentene and the lower α-olefin polymer in the block copolymer network, the better the chance for formation of co-continuous interlocking networks on subsequent cooling. Therefore, it has been found important to the preparation of an IPN that the ratio of the 4-methyl-1-pentene polymer viscosity to the lower α-olefin polymer viscosity be controlled according to the equation:

$\log_{10}$ (Viscosity A/Viscosity B)=R+2−4(Volume Fraction of B) where A represents the 4-methyl-1-pentene polymer, B represents the lower alpha olefin polymer and the expression "Volume Fraction of B" means the volume of B divided by the sum of the volumes of A and B. In the above equation R is a number between 1 and −1, preferably between 0.7 and −0.7 and more preferably between 0.3 and −0.3. The viscosity of the block copolymer should at least equal that of the less viscous of the two polymers A and B and preferably at least equal that of the more viscous of the two polymers A and B. Details of this technique of producing an IPN by isoviscous mixing are taught in Chapter 14 of "Thermoplastic Elastomers—A Comprehensive Review", N. R. Legge, G. Holden and H. E. Schroeder, Eds., Hanser, Munich, West Germany, 1987. As is well known in the prior art, temperature as well as blending shear rate can be varied to vary the ratio of the relative viscosities of the polymeric components blended. As is also well known, viscosity modifiers could be blended with one or more of the polymers to further modify the viscosity ratios. Various viscosity modifiers that could be used for this purpose and the method of such use are disclosed in U.S. Pat. Nos. 4,079,099 and 4,107,130.

In general, the blending may be accomplished in any blending apparatus capable of creating sufficient mechanical shear and thermal energy to insure that interlocking of the various polymer networks is achieved. Intimate mixing is conveniently achieved by using a high shear extrusion compounding machine such as a twin screw compounding extruder or a thermoplastic extruder having a length to diameter ratio (L:D) of at least 10:1 and a compression ratio within the range from about 1.5:1 to about 4:1.

In general, the order in which the polymeric components of the thermoplastic elastomer compositions of this invention are blended is not critical. Satisfactory IPNs can, then, be prepared by first blending any two of the polymeric components and then blending this two component blend with an additional component (the third component) as well as by blending all of the polymeric components simultaneously. In some cases, however, a sequential blending technique such as first blending two components and then blending this two component blend with an additional (third) component may enhance the viscosity match as between the two component blend and the added polymeric component.

As used herein, isoviscous mixing means that the relative viscosities of the polymeric components in the blend at the temperature and shear rate of the blending are properly matched., i.e., the viscosities are matched according to the equation hereinbefore specified. It will, of course, be appreciated that when an extruder is used to effect the blending, there is, generally, a wide distribution of shear rates within the extruder. For purposes of this invention, isoviscous mixing will occur even though the viscosity curves of two or more polymers differ at some of the shear rates encountered within the extruder so long as the viscosities are properly matched in some portion of the extruder.

The thermoplastic elastomer compositions of this invention may also contain additional components such as other polymers, extender oils, fillers, reinforcing agents, antioxidants, stabilizers, fire retardants, antiblocking agents and other rubber and plastic compounding ingredients. In general, each of these components, when used, will be added at concentrations well known in the prior art and each will be used for its intended purpose as known in the prior art.

The thermoplastic elastomer composition of this invention may be used to prepare shaped articles capable of withstanding relatively high temperatures. The shaped articles may be prepared using any of the molding techniques known in the prior art. In general, molded articles prepared with the thermoplastic elastomer composition of this invention will withstand temperatures up to about 200° C. As a result, molded articles prepared with the thermoplastic elastomer compositions of this invention can be effectively used in "under-the-hood" applications in automobiles operated with an internal combustion engine and the like and in similar environments.

PREFERRED EMBODIMENT OF THE INVENTION

In a preferred embodiment of the present invention, a thermoplastic elastomer composition will be prepared by melt blending an isotactic polypropylene, a 4-methyl-1-pentene copolymer and a block copolymer comprising two polymeric blocks predominantly of polymerized monoalkenyl aromatic hydrocarbon monomer units and a single polymeric block predominantly of polymerized conjugated diolefin monomer units. The block copolymer will be selectively hydrogenated so as to convert (saturate) at least about 98% of the ethylenic unsaturation initially contained therein. The blending will be accomplished isoviscously and at conditions such that the ratio of the viscosity of the isotactic polypropylene to the viscosity of the 4-methyl-1-pentene copolymer at the conditions of blending is given by the equation:

$\log_{10}$ (Viscosity A/Viscosity B)=R+2−4(Volume Fraction of B) where A represents the 4-methyl-1-pentene polymer, B represents the isotactic polypropylene, the expression "Volume Fraction of B" means the volume of B divided by the sum of the volumes of A and B and R is a number between 0.7 and −0.7, most preferably between 0.3 and −0.3. In the preferred embodiment, the viscosity of the block copolymer will be greater than that of the more viscous of the two polymers A and B. In the preferred embodiment, the isotactic polypropylene will exhibit a degree of crystallinity of at least about 50% as determined by X-ray chromotography and a number average molecular weight within the range from about 100,000 to about 300,000. The 4-methyl-1-pentene copolymer will contain more than about 80 wt % 4-methyl-1-pentene and less than about 20 wt % of an α-olefin having from about 3 to about 8 carbon atoms. The 4-methyl-1-pentene copolymer will have a number average molecular weight within the range from about 50,000 to about 300,000. Each of the polymeric blocks in the block copolymer containing predominantly monoalkenyl aromatic hydrocarbon monomer units will have weight average molecular weights within the range from about 10,000 to about 30,000 and the polymeric block of the block copolymer containing predominantly conjugated diolefin monomer units, before hydrogenation, will have a weight average molecular weight within the range from about 40,000 to about 120,000. In the preferred embodiment of this invention, the thermoplastic elastomer composition will comprise from about 25 to about 65 wt % isotactic polypropylene, from about 25 to about 65 wt % 4-methyl-1-pentene polymer and from about 5 to about 20 wt % of the block copolymer. In the preferred embodiment, the polymeric components of the thermoplastic elastomer composition of this invention will be blended simultaneously in a twin screw extruder having an L:D within the range from about 10:1 to about 30:1 and a compression ratio within the range from about 2:1 to about 4:1. In a most preferred embodiment, the polymeric blocks predominantly of polymerized monoalkenyl aromatic hydrocarbon monomer units in the block copolymer will be styrene homopolymers and the polymeric block predominantly of polymerized conjugated diolefin monomer units in the block copolymer will, before hydrogenation, be a homopolymer of butadiene. In both the preferred and most preferred embodiments, the blending of the polymeric components in the thermoplastic elastomer composition will be accomplished at a temperature within the range from about 180° to about 260° C.

Having thus broadly described the present invention and a preferred and most preferred embodiment thereof, it is believed that the invention will become even more apparent by reference to the following Examples. It will be appreciated, however, that the Examples are presented solely for purposes of illustration and should not be construed as limiting the invention unless one or more of the limitations introduced in the Examples are incorporated into the claims appended hereto and then only to the extent that such limitations are thus incorporated.

EXAMPLE

In this Example, an IPN was prepared with a thermoplastic elastomer composition comprising 60 wt % isotactic polypropylene, 30 wt % of a 4-methyl-1-pentene copolymer and 10 wt % of a selectively hydrogenated triblock copolymer. The selectively hydrogenated triblock copolymer had terminal polymer blocks of polystyrene each having a weight average molecular weight of about 29,000 and a central polymeric block of hydrogenated polybutadiene having a weight average molecular weight of 118,000. The IPN was prepared by blending the three components simultaneously at a temperature of 230° C. in a twin screw extruder having an L:D of 13:1. After the IPN was prepared, a portion of the composition was shaped into a suitable structure and tested for flexural modulus (ASTM D-790) and for notched Izod (ASTM 256). A portion of the IPN was also shaped into an ASTM tensile bar (ASTM 412) which bar was then secured horizontally in a heat sag apparatus and exposed to 350° F. overnight. The sample was then observed to determine the extent of sagging and/or deformation. As a result of this observation, it was determined that the tensile bar exhibited minimal sagging. Also, it was determined that the tangent flexural modulus was 109,000 psi and the notched Izod value was 1.32 ft lb/in.

COMPARATIVE EXAMPLE

In this Example, an IPN was prepared from a polymeric blend comprising 66.7 wt % isotactic polypropylene, which polypropylene was identical to that used in the IPN prepared in the previous Example and 3.3 wt % of a 4-methyl-1-pentene copolymer identical to that used in the IPN of the previous Example. The IPN was prepared in the same manner as was used to prepare the IPN of the previous Example. After preparation of the IPN was complete, the flexural modulus and the notched Izod thereof were determined using the same techniques as were used in the Example. Also, a portion of the IPN was shaped into an ASTM tensile bar which bar was then secured horizontally in a heat sag apparatus and exposed to 350° overnight. After this exposure, the bar was then observed for distortion and sagging. Also in this Example, the flexural modulus and notched Izod of a structure prepared with the isotactic polypropylene used in the IPN of the previous Example and the 4-methyl-1-pentene copolymer used in the IPN of the previous Example were determined. Further, ASTM tensile bars were prepared with each of these polymers, which bars were then placed horizontally in a heat sag apparatus and exposed to 350° F. overnight. These bars too were then observed for distortion and sagging. As a result of observation, it was determined that the tensile bar prepared with the IPN of this Example sagged more than the tensile bar prepared with the IPN of the previous Example. The tensile bar prepared with the 4-methyl-1-pentene copolymer sagged less than the tensile bar prepared with the IPN of the previous Example while the tensile bar prepared with the polypropylene melted. The tangent flexural modulus of the IPN prepared in this Example was 140,000 psi, while the tangent flexural modulus of the polypropylene was 202,000 psi and the tangent flexural modulus of the 4-methyl-1-pentene copolymer was 72,000 psi. The notched Izod value determined with the IPN of this Example was 0.41 ft lb/in., the notched Izod value of the polypropylene structure was 0.36 ft lb/in. and the Izod number of the structure prepared with the 4-methyl-1-pentene copolymer was 0.47 ft lb/in. As will be apparent from the data obtained in this and the foregoing Example, the IPN prepared in the previous Example, on balance, exhibited a good flexural modulus, a good notched Izod value and good heat resistance.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A thermoplastic elastomer composition comprising:
   (a) from about 20 to about 70 weight percent of a polymer of a lower α-olefin having from 2 to 5 carbon atoms;
   (b) from about 20 to about 70 weight percent of a polymer of a 4-methyl-1-pentene polymer; and
   (c) from about 5 to about 25 weight percent of a block copolymer comprising at least two polymeric blocks predominantly polymerized from monoalkenyl-aromatic hydrocarbon monomer units and at least one polymeric block predominantly polymerized from conjugated diolefin monomer units which at least one polymeric block is selectively hydrogenated after polymerization.

2. The composition of claim 1 wherein said 4-methyl-1-pentene polymer is a copolymer of 4-methyl-1-pentene and an α-olefin different from 4-methyl-1-pentene having from 2 to 18 carbon atoms.

3. The composition of claim 2, wherein said polymer of an α-olefin containing from 2 to 5 carbon atoms is isotactic polypropylene.

4. The composition of claim 3 wherein said at least two polymeric blocks predominantly polymerized from monoalkenyl aromatic hydrocarbon monomer units are homopolymers of styrene and said at least one polymeric block predominantly polymerized from conjugated diolefin monomer units is a homopolymer of polybutadiene.

5. An IPN prepared from a thermoplastic elastomer composition comprising:
   (a) from about 20 to about 70 weight percent of a polymer of a lower α-olefin having from 2 to 5 carbon atoms;
   (b) from about 20 to about 70 weight percent of a 4-methyl-1-pentene polymer; and
   (c) from about 5 to about 25 weight percent of a block copolymer comprising at least two polymeric blocks predominantly polymerized from monoalkenyl-aromatic hydrocarbon monomer units and at least one polymeric block predominantly polymerized from conjugated diolefin monomer units which at least one polymeric block is selectively hydrogenated after polymerization.

6. The IPN of claim 5 wherein aid 4-methyl-1-pentene polymer is a copolymer of 4-methyl-1-pentene and an α-olefin having from 2 to 18 carbon atoms.

7. The IPN of claim 6 wherein said polymer of an α-olefin containing from 2 to 5 carbon atoms is isotactic polypropylene.

8. The IPN of claim 7 wherein said block copolymer comprises two polymeric blocks predominantly polymerized from monoalkenyl aromatic hydrocarbon monomer units and a single polymeric block predominantly polymerized from conjugated diolefin monomer units.

9. The IPN of claim 8 wherein said polymeric blocks predominantly polymerized from monoalkenyl aromatic hydrocarbon monomer units are homopolymers of styrene and said polymeric block k predominantly polymerized from conjugated diolefin monomer units is a homopolymer of polybutadiene.

* * * * *